United States Patent
Klaus

(10) Patent No.: US 11,066,943 B2
(45) Date of Patent: Jul. 20, 2021

(54) INTERMEDIATE CASING FOR A COMPRESSOR IN A GAS TURBINE ENGINE AND A GAS TURBINE ENGINE

(71) Applicant: Rolls-Royce Deutschland Ltd & Co KG, Blankenfelde-Mahlow (DE)

(72) Inventor: Christoph Klaus, Teltow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 27 days.

(21) Appl. No.: 16/720,862

(22) Filed: Dec. 19, 2019

(65) Prior Publication Data

US 2020/0200022 A1  Jun. 25, 2020

(30) Foreign Application Priority Data

Dec. 19, 2018 (DE) ............... 10 2018 132 892.3

(51) Int. Cl.
| | |
|---|---|
| *F01D 9/04* | (2006.01) |
| *F01D 25/24* | (2006.01) |
| *F02C 7/36* | (2006.01) |
| *F02C 3/04* | (2006.01) |

(52) U.S. Cl.
CPC ............. *F01D 9/041* (2013.01); *F01D 25/24* (2013.01); *F02C 3/04* (2013.01); *F02C 7/36* (2013.01); *F05D 2220/32* (2013.01); *F05D 2300/603* (2013.01)

(58) Field of Classification Search
CPC ........ F01D 9/041; F01D 25/162; F01D 25/24; F02C 3/04; F02C 7/36; F05D 2220/32; F05D 2240/12; F05D 2300/603; Y02T 50/60
See application file for complete search history.

(56) References Cited

U.S. PATENT DOCUMENTS

| | | | | |
|---|---|---|---|---|
| 5,222,360 | A * | 6/1993 | Antuna ................. | B64D 27/26 60/226.1 |
| 5,411,370 | A * | 5/1995 | Varsik .................... | F01D 25/04 415/209.4 |
| 6,860,716 | B2 * | 3/2005 | Czachor ............... | F01D 25/162 415/142 |
| 8,371,812 | B2 * | 2/2013 | Manteiga ............... | F01D 25/28 415/209.3 |

(Continued)

OTHER PUBLICATIONS

German Search Report dated Sep. 11, 2019 from counterpart German Patent Application No. 102018132892.3.

*Primary Examiner* — Igor Kershteyn
(74) *Attorney, Agent, or Firm* — Shuttleworth & Ingersoll, PLC; Timothy J. Klima

(57) ABSTRACT

An intermediate-casing structure for a compressor in a gas turbine engine, in particular an aircraft engine, having a plurality of components including at least one static blade row for deflecting at least one airflow entering the intermediate-casing structure, and at least one ring, on which the blade rows are radially arranged, characterized in that at least one first component of the intermediate-casing structure is formed from composite material, in particular fiber-composite material, or exhibits composite material, and at least one second component of the intermediate-casing structure is formed from metal or exhibits metal. Furthermore, the invention relates to a gas turbine device.

15 Claims, 5 Drawing Sheets

(56) References Cited

U.S. PATENT DOCUMENTS

| | | | | |
|---|---|---|---|---|
| 2006/0042223 A1* | 3/2006 | Walker | .................. | F01D 25/162 |
| | | | | 60/39.08 |
| 2013/0028718 A1* | 1/2013 | Strom | ................... | F01D 25/162 |
| | | | | 415/182.1 |
| 2013/0094951 A1* | 4/2013 | McCaffrey | ............ | F01D 25/246 |
| | | | | 415/200 |
| 2014/0190180 A1* | 7/2014 | Soderlund | ................. | F02C 7/20 |
| | | | | 60/797 |
| 2016/0177761 A1* | 6/2016 | Huizenga | .............. | F01D 25/162 |
| | | | | 415/209.3 |
| 2016/0263856 A1 | 9/2016 | Roach et al. | | |
| 2016/0290147 A1* | 10/2016 | Weaver | ................. | F01D 25/005 |
| 2017/0241291 A1 | 8/2017 | Boeck | | |
| 2018/0023406 A1 | 1/2018 | Zaccardi et al. | | |
| 2018/0156237 A1 | 6/2018 | Papin et al. | | |

\* cited by examiner

INTERMEDIATE CASING FOR A COMPRESSOR IN A GAS TURBINE ENGINE AND A GAS TURBINE ENGINE

This application claims priority to German Patent Application DE102018132892.3 filed Dec. 19, 2018, the entirety of which is incorporated by reference herein.

The present disclosure relates to an intermediate-casing structure for a compressor device of a gas turbine engine and to a gas turbine device having features as disclosed herein.

Gas turbine engines, for example aircraft engines, typically have regions with very different operating conditions. Thus, for example in an aircraft engine, the regions of the compressor, of the turbine and of the combustion chamber differ very greatly in terms of operating parameters. Therefore, it is necessary to use components that are each adapted to the operating conditions (pressure, temperature, flow conditions etc.).

US 2017/0241291 A1, for example, discloses surrounding the turbine region in an aircraft engine with an intermediate-casing device radially on the outside. Intermediate-casing devices have the objective of directing the entering airflow in a particular direction. Furthermore, intermediate-casing devices also have structural objectives in order to absorb and/or to distribute mechanical loads within the aircraft engine.

Other regions in an aircraft engine, for example a compressor region, also sometimes have an intermediate-casing structure (see for example US 2018/0023406 A1).

Therefore, it is necessary to provide corresponding mechanically stable and weight-efficient intermediate-casing structures.

In one aspect of the solution proposed herein, the intermediate-casing structure is arranged for a compressor in a gas turbine engine, in particular an aircraft engine. The intermediate-casing structure is constructed from several components. In this case, the components include at least one static blade row for deflecting at least one airflow entering the intermediate-casing structure. The airflow can be for example a bypass airflow or a core airflow. Furthermore, the components include at least one ring on which the blade rows are radially arranged.

In this case, at least one first component of the intermediate-casing structure is formed from composite material, in particular fiber-composite material, or exhibits composite material, and at least one second component of the intermediate-casing structure is formed from metal or exhibits metal.

The apportioning of the materials to different components creates possibilities for a loading-appropriate and weight-efficient construction.

In this case, in one embodiment, at least one radially arranged stabilizing strut can be arranged between two rings that are arranged concentrically with one another, in order to confer mechanical stability on the ring structure with the blade rows.

In this case, in one embodiment, the at least one first component, i.e. the component made of or exhibiting composite material, can be exposed to lower mechanical loading in operation than the at least one second component. In particular, the at least one first component can experience quite predominantly aerodynamic loading in operation.

Thus, it is possible for example for the at least one first component to be designed as a static blade row and/or as an outer ring at the outer circumference of the intermediate-casing structure.

In addition or alternatively, the at least one second component can experience predominantly mechanical loading from solid bodies (for example transmit compressive forces, tensile forces, torsional moments, vibrations via solid components) during operation, i.e. not aerodynamic loading. In this case, the at least one second component can be designed as a ring on which blade rows are arranged. In one particular embodiment, the at least one second component comprises an inner ring, a middle ring and an outer ring, wherein the rings are arranged concentrically with one another.

For easier assembly, the at least one second component can have at least one fastening element, in particular on the outer side of the outer ring. The fastening element can be designed for example as an eyelet or as a perforated plate, such that a hook can engage for lifting.

The at least one second component, i.e. the one that is made of metal or exhibits metal, also has at least one stabilizing strut, since it has to absorb primarily mechanical loads from solid bodies. In this case, the at least one stabilizing strut can be formed integrally with a fastening element and/or with the middle ring. The integral design allows for example efficient production by a casting method. It is also possible for the at least one stabilizing strut to have an aerodynamically active profile, such that, in addition to the mechanical stabilizing function, it is also provided with an aerodynamic function.

It is also possible to provide a gas turbine engine with one embodiment of an intermediate-casing structure.

As noted elsewhere herein, the present disclosure may relate to a gas turbine engine, e.g. an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be particularly, although not exclusively, beneficial for geared fans, which are driven via a gearbox. Accordingly, the gas turbine engine can comprise a gearbox which is driven via the core shaft and the output of which drives the fan in such a way that it has a lower speed than the core shaft. The input to the gearbox may be directly from the core shaft, or indirectly via the core shaft, for example via a spur shaft and/or gear. The core shaft may be rigidly connected to the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gearbox may be designed to be driven by the core shaft that is configured to rotate (for example in use) at the lowest rotational speed (for example the first core shaft in the example above). For example, the gearbox may be designed to be driven only by the core shaft that is configured to rotate (for example in use) at the lowest rotational speed (for example only by the first core shaft, and not the second core shaft, in the example above). Alternatively, the gearbox may be designed to be driven by one or more shafts, for example the first and/or second shaft in the example above.

In any gas turbine engine as described and/or claimed herein, a combustor may be provided axially downstream of the fan and compressor or compressors. For example, the combustor may be directly downstream of (for example at the exit of) the second compressor, where a second compressor is provided. By way of further example, the flow at the exit to the compressor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (i.e. the angle of incidence may be variable). The row of rotor blades and the row of stator vanes may be axially offset with respect to each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset with respect to each other.

Each fan blade may have a radial span extending from a root (or hub) at a radially inner gas-washed location, or from a 0% span position, to a tip with a 100% span position. The ratio of the radius of the fan blade at the hub to the radius of the fan blade at the tip may be less than (or on the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form the upper or lower bounds). These ratios may commonly be referred to as the hub-to-tip ratio. The radius at the hub and the radius at the tip may both be measured at the leading edge (or axially forwardmost edge) of the blade. The hub-to-tip ratio refers, of course, to the gas-washed portion of the fan blade, i.e. the portion radially outside any platform.

The radius of the fan may be measured between the engine centreline and the tip of the fan blade at its leading edge. The fan diameter (which may generally be twice the radius of the fan) may be greater than (or on the order of) any of the following: 250 cm (around 100 inches), 260 cm (around 102 inches), 270 cm (around 105 inches), 280 cm (around 110 inches), 290 cm (around 115 inches), 300 cm (around 120 inches), 310 cm (around 122 inches), 320 cm (around 125 inches), 330 cm (around 130 inches), 340 cm (around 135 inches), 350 cm (around 138 inches), 360 cm (around 140 inches), 370 cm (around 145 inches), 380 cm (around 150 inches) or 390 cm (around 155 inches). The fan diameter may be in an inclusive range bounded by any two of the values in the previous sentence (i.e. the values may form the upper or lower bounds).

The rotational speed of the fan may vary in operation. Generally, the rotational speed is lower for fans with a larger diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at the leading edge multiplied by angular speed). The fan tip loading at cruise conditions may be greater than (or on the order of) any of the following: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5 or 17. The bypass ratio may be in an inclusive range bounded by any two of the values in the previous sentence (i.e. the values may form the upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form the upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form the upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form the upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form the upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form the upper or lower bounds). The maximum TET may occur, for example, at a high thrust condition, for example at a maximum take-off thrust (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which is manufactured using a material that is better able to resist impact (for example from birds, ice or other material) than the rest of the blade. Such a leading edge may, for example, be manufactured using titanium or a titanium based alloy. Thus, purely by way of example, the fan blade may have a carbon-fibre or aluminium based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disk). Purely by way of example, such a fixture may be in the form of a dovetail that may slot into and/or engage a corresponding slot in the hub/disk in order to fix the fan blade to the hub/disk. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied in operation. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise condition may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In operation, a gas turbine engine described and/or claimed herein may operate at the cruise conditions defined elsewhere herein. Such cruise conditions may be determined by the cruise conditions (for example the mid-cruise conditions) of an aircraft to which at least one (for example two or four) gas turbine engine(s) may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example, with reference to the figures, in which.

Figure 1:
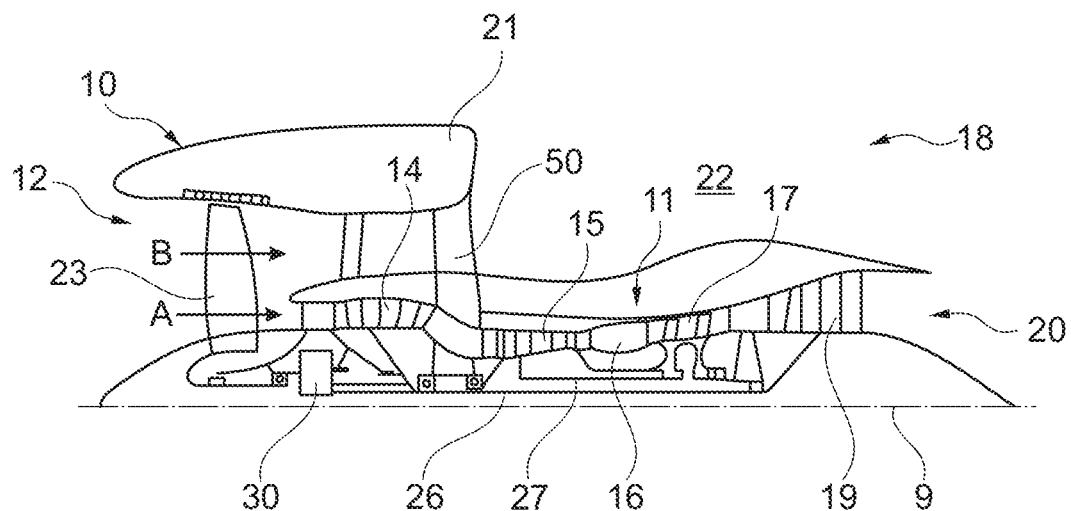
FIG. 1 is a sectional side view of a gas turbine engine.

FIG. 1 illustrates a gas turbine engine 10 having a principal rotational axis 9. The gas turbine engine 10 comprises an air intake 12 and a fan 23 that generates two airflows: a core airflow A and a bypass airflow B. The gas turbine engine 10 comprises a core 11 that receives the core airflow A. When viewed in the order corresponding to the axial direction of flow, the core engine 11 comprises a low pressure compressor 14, a high pressure compressor 15, a combustion device 16, a high pressure turbine 17, a low pressure turbine 19 and a core thrust nozzle 20. A nacelle 21 surrounds the gas turbine engine 10 and defines a bypass duct 22 and a bypass thrust nozzle 18. The bypass airflow B flows through the bypass duct 22. The fan 23 is attached to and driven by the low pressure turbine 19 via a shaft 26 and an epicyclic planetary gearbox 30.

In operation, the core airflow A is accelerated and compressed by the low pressure compressor 14 and directed into the high pressure compressor 15 where further compression takes place. The compressed air exhausted from the high pressure compressor 15 is directed into the combustion device 16, where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic planetary gearbox 30 is a reduction gearbox.

Arranged axially at the exit of the nacelle 21 is an intermediate-casing structure 50, the function of which is described in more detail in conjunction with FIGS. 4 to 8. In other embodiments, the nacelle 21 can extend axially over the region of the low pressure compressor 14 and into the region of the high pressure turbine 17.

Figure 2:
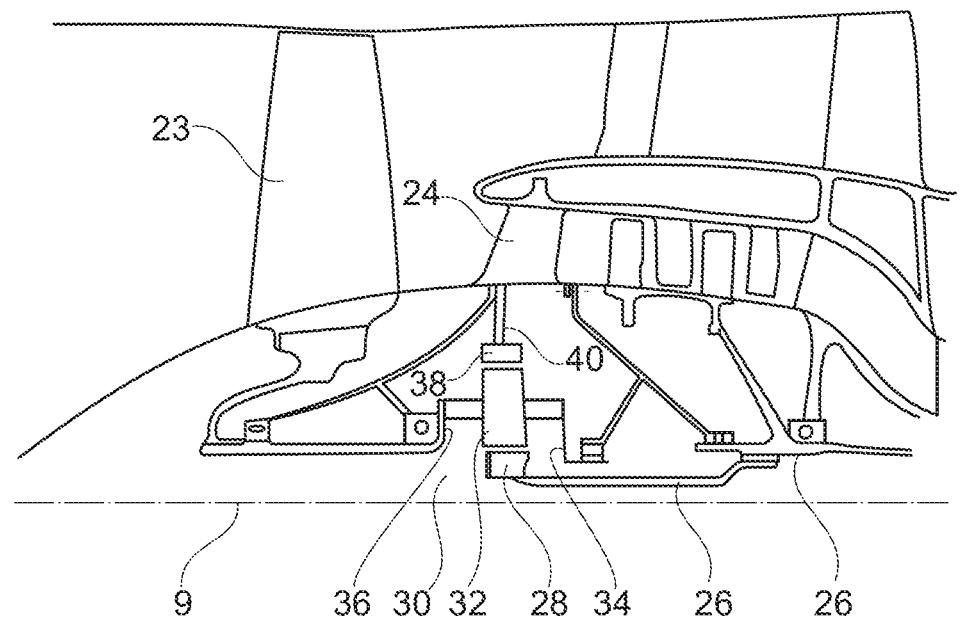
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun gear 28 of the epicyclic planetary gearbox 30. Radially outwardly of the sun gear 28 and intermeshing therewith is a plurality of planet gears 32 that are coupled together by a planet carrier 34. The planet carrier 34 guides the planet gears 32 in such a way that they precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
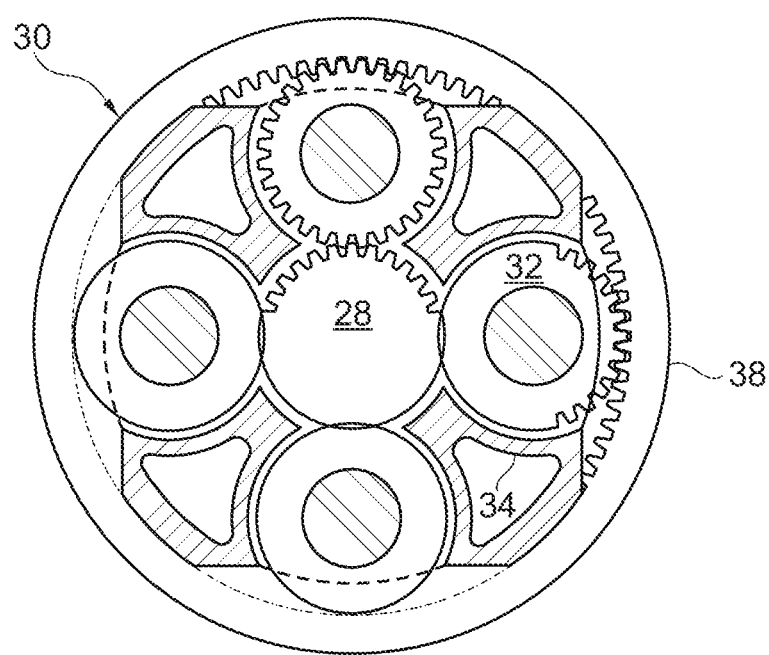
FIG. 3 is a partially cut-away view of a gearbox for a gas turbine engine.

The epicyclic planetary gearbox 30 is shown by way of example in greater detail in FIG. 3. Each of the sun gear 28, planet gears 32 and ring gear 38 comprise teeth on their periphery to allow intermeshing with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of an epicyclic planetary gearbox 30 generally comprise at least three planet gears 32.

The epicyclic planetary gearbox 30 illustrated by way of example in FIGS. 2 and 3 is a planetary gearbox in which the planet carrier 34 is coupled to an output shaft via linkages 36, with the ring gear 38 fixed. However, any other suitable type of planetary gearbox 30 may be used. By way of further example, the planetary gearbox 30 may be a star arrangement, in which the planet carrier 34 is held fixed, with the ring gear (or annulus) 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the gas turbine engine 10 and/or for connecting the gearbox 30 to the gas turbine engine 10. By way of further example, the connections (such as the linkages 36, 40 in the FIG. 2 example) between the gearbox 30 and other parts of the gas turbine engine 10 (such as the input shaft 26, the output shaft and the fixed structure 24) may have a certain degree of stiffness or flexibility. By way of further example, any suitable arrangement of the bearings between rotating and stationary parts of the gas turbine engine 10 (for example between the input and output shafts of the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or epicyclic-planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 possibly does not comprise a gearbox 30.

The geometry of the gas turbine engine 10, and components thereof, is or are defined by a conventional axis system, comprising an axial direction (which is aligned with the rotational axis 9), a radial direction (in the bottom-to-top direction in FIG. 1), and a circumferential direction (perpendicular to the view in FIG. 1). The axial, radial and circumferential directions are mutually perpendicular.

With reference to FIGS. 4 to 8, different embodiments of an intermediate-casing structure 50, which externally surrounds a compressor 14, 15 in a gas turbine engine 10, in this case an aircraft engine, will now be described.

Figure 4:
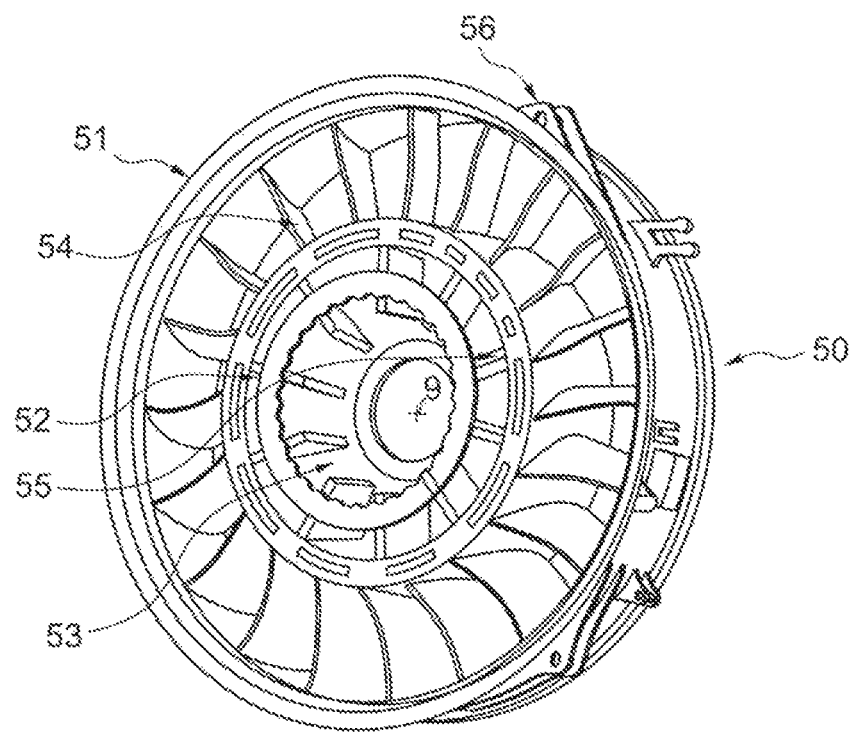
FIG. 4 is a first embodiment of an intermediate-casing structure.

FIG. 4 describes the basic structure of the intermediate-casing structure 50. Arranged concentrically around the principal rotational axis 9 are three rings, the outer ring 51, the middle ring 52 and the inner ring 53. Blade rows 54, 55 (stators), namely the outer blades 54 and the inner blades 55, extend radially between the rings 51, 52, 53. Arranged at the outer circumference of the outer ring 51 is a row of fastening elements 56, to which a hook can be fastened for example for assembly.

Air flows against the outer blades 54, said air being passed by the fan 23 through the bypass duct 22. The outer blades 54 serve to ensure efficient outflow out of the bypass thrust nozzle 18.

The bypass airflow B likewise flows against the inner blades 55, wherein the airflow is passed by the inner blades 54 into the high pressure compressor 15. In principle, depending on the design of the gas turbine engine 10, different arrangements of rings 51, 52, 53 and blade rows 54, 55 are possible.

The inner and the outer blades 54, 55 are designed in one row in the illustrated embodiment. In this case, the blades 54, 55 are all designed with the same size (i.e. length), wherein they can also transmit mechanical loads from the inner ring 53, via the middle ring 52, to the outer ring 51.

For a balanced ratio between strength and lowest possible mass of the intermediate-casing structure 50, in the illustrated embodiment, the blade rows 54, 55 are produced as a first component from a composite material, in particular a fiber-composite material. The blade rows 54, 55 are exposed primarily to aerodynamic forces in operation. This material is lightweight but also mechanically loadable.

Second components, for example the middle ring 52 and the inner ring 53, are constructed from metal. These components are exposed to mechanical loads, for example torsional stresses, in operation.

In any case, there are two classes of components:

At least one first component of the intermediate-casing structure 50 is made of a composite material, in particular fiber-composite material, or exhibits at least composite material.

At least one second component of the intermediate-casing structure 50 is made of metal or exhibits at least metal.

As a result of the distribution of composite materials and metallic materials in the intermediate-casing structure 50, it is possible to embody these in a loading-appropriate and at the same time weight-saving manner.

Primary loads are absorbed preferably via metallic components, secondary loads (especially aerodynamic loads) are absorbed preferably via components made of composite materials.

FIGS. 5 to 8 illustrate further embodiments in variations of this basic principle, wherein reference can be made in principle to the relevant description above.

Figure 5:
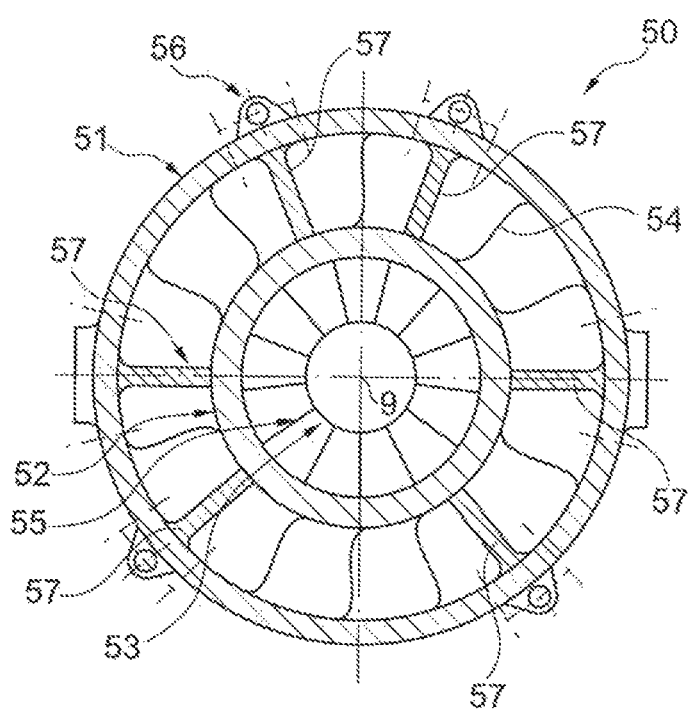
FIG. 5 is a second embodiment of an intermediate-casing structure.

FIG. 5 illustrates a second embodiment, in which the intermediate-casing structure 50 likewise has an outer ring 51, a middle ring 52 and an inner ring 53. Arranged radially between each of these concentrically arranged rings 51, 52, 53 is a blade row 54, 55. Furthermore, six stabilizing struts 57 are arranged between the outer ring 51 and the middle ring 52. The stabilizing struts 57 can in this case by all means have an aerodynamically active profile, such that they can change the direction of flow and/or the flow velocity of the air flowing through.

Arranged at the outer circumference of the outer ring 51 are four fastening elements 56 in the form of grommets.

Here too, different components are manufactured from different materials. The outer blade row 54 and the outer ring 51 are produced here from composite material.

The other components of the intermediate-casing structure 50 are constructed from metal: the inner ring 53, the middle ring 52 and the inner blade row 55.

Figure 6:
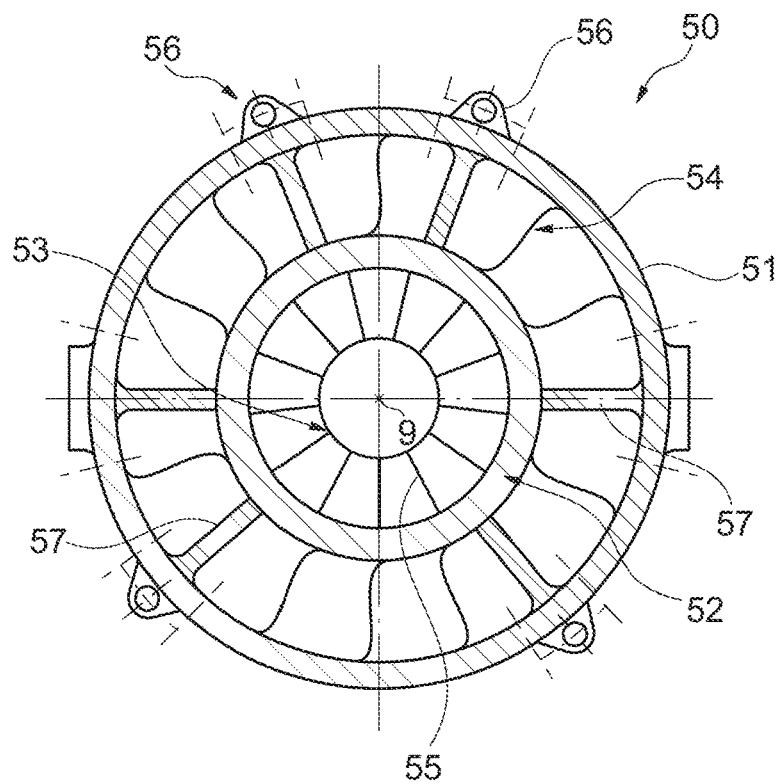
FIG. 6 is a third embodiment of an intermediate-casing structure.

FIG. 6 illustrates a third embodiment, the structure of which corresponds to the second embodiment.

In this case, the outer ring 51 can have for example a structure wound from fibers or tape. The outer blade row 54 can be produced for example by a 3D textile weaving process.

The inner ring 53 is embodied here as a type of hub and can be produced for example in a casting process.

The fastening elements 56 can be embodied as cast parts or be formed integrally with the radial stabilizing struts 57. The stabilizing struts 57 can alternatively or additionally be designed integrally with the middle ring 52.

Figure 7:
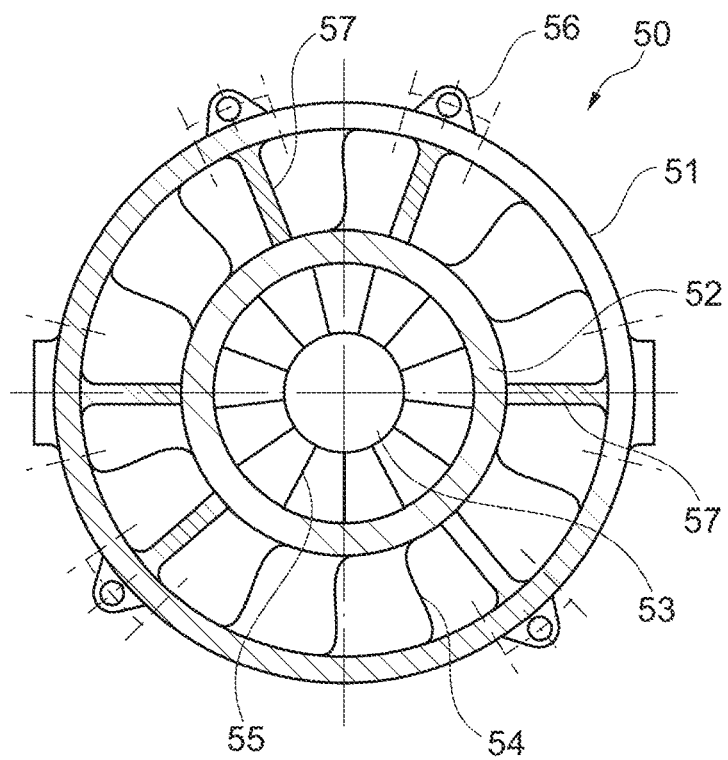
FIG. 7 is a fourth embodiment of an intermediate-casing structure.

FIG. 7 illustrates a fourth embodiment, the basic structure of which is the same as that of the previous embodiments.

Here, only the outer blade row 54 is produced from a composite material. All other components are manufactured from metal.

Figure 8:
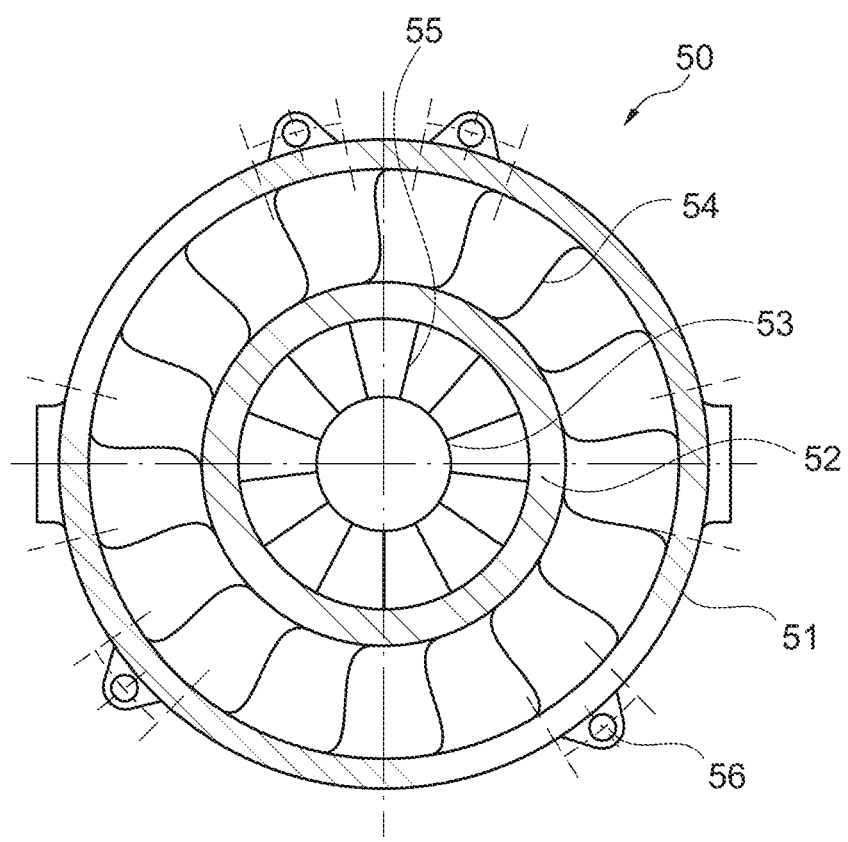
FIG. 8 is a fifth embodiment of an intermediate-casing structure.

FIG. 8 illustrates a fifth embodiment, the basic structure of which is the same as that of the previous embodiments. Here, however, no stabilizing struts 57 are provided.

Here, only the outer ring 51 is produced from a composite material. All other components are manufactured from metal.

The components 51, 52, 53, 54, 55, 56, 57 can be produced for example individually and then be connected together for example by welding, adhesive bonding, a form fit or integrally.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE SIGNS

9 Principal rotational axis
10 Gas turbine engine
11 Core engine
12 Air intake
14 Low pressure compressor
15 High pressure compressor
16 Combustion device
17 High pressure turbine
18 Bypass thrust nozzle
19 Low pressure turbine
20 Core thrust nozzle
21 Nacelle
22 Bypass duct
23 Fan
24 Stationary supporting structure
26 Shaft
27 Interconnecting shaft
28 Sun gear
30 Gearbox
32 Planet gears
34 Planet carrier
36 Linkage
38 Ring gear
40 Linkage
50 Intermediate-casing structure
51 Outer ring of the intermediate-casing structure
52 Middle ring of the intermediate-casing structure
53 Inner ring of the intermediate-casing structure
54 Outer blade row of the intermediate-casing structure
55 Inner blade row of the intermediate-casing structure
56 Fastening elements
57 Stabilizing strut
A Core airflow
B Bypass airflow

The invention claimed is:

1. An intermediate-casing structure for a compressor in a gas turbine engine, comprising: at least one static blade row for deflecting at least one airflow entering the intermediate-casing structure, a plurality of rings, on which the at least one static blade row is radially arranged,
at least one first component of the intermediate-casing structure formed from composite material or including composite material,
at least one second component of the intermediate-casing structure formed from metal or including metal, and
the plurality of rings including an outer ring, a middle ring and an inner ring arranged concentrically around a principal rotational axis of the gas turbine engine, wherein the at least one static blade row includes outer blades and inner blades extending radially between the outer, middle and inner rings.

2. The intermediate-casing structure according to claim 1, and further comprising at least one stabilizing strut radially arranged between two of the plurality of rings that are arranged concentrically with one another.

3. The intermediate-casing structure according to claim 1, wherein the at least one first component is exposed to lower mechanical loading in operation than the at least one second component.

4. The intermediate-casing Intermediate casing structure according to claim 1, wherein the at least one first component experiences predominantly aerodynamic loading in operation.

5. The intermediate-casing structure according to claim 4, wherein the at least one first component is configured as at least one chosen from the at least one a static blade row and the outer ring at an outer circumference of the intermediate-casing structure.

6. The intermediate-casing structure ng to claim 1, wherein the at least one second component experiences predominantly mechanical loading from solid bodies during operation.

7. The intermediate-casing structure according to claim 6, wherein the at least one second component is configured as at least one of the plurality of rings.

8. The intermediate-casing structure according to claim 7, wherein the at least one second component comprises the inner ring, the middle ring and the outer ring.

9. The intermediate-casing structure according to claim 6, wherein the at least one second component includes at least one fastening element on an outer side of the outer ring.

10. The intermediate-casing structure according to claim 2, wherein the at least one second component includes the at least one stabilizing strut.

11. The intermediate-casing structure according to claim 10, wherein the at least one stabilizing strut is formed integrally with at least one chosen from a fastening element and the middle ring.

12. The intermediate-casing structure according to claim 10, wherein the at least one stabilizing strut has an aerodynamically active profile.

13. A gas turbine engine for an aircraft, comprising:
a core engine, which comprises a turbine, a compressor and a core shaft connecting the turbine to the compressor;
a fan, which is positioned upstream of the core engine, wherein the fan comprises a plurality of fan blades; and
a gearbox, which is driven by the core shaft, wherein the fan is driven by the gearbox at a lower speed than the core shaft, the intermediate-casing structure according to claim 1.

14. The gas turbine engine according to claim 13, configured as an aircraft engine.

15. The intermediate-casing structure according to claim 1, wherein the at least one first component of the intermediate-casing structure is formed from fiber-composite material or includes fiber-composite material.

* * * * *